United States Patent
Okamoto

(10) Patent No.: US 9,242,673 B2
(45) Date of Patent: Jan. 26, 2016

(54) VEHICLE BODY FRONT PORTION STRUCTURE

(71) Applicant: TOYOTA JIDOSHA KABUSHIKI KAISHA, Toyota-shi, Aichi (JP)

(72) Inventor: Atsushi Okamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/409,385

(22) PCT Filed: Jul. 4, 2013

(86) PCT No.: PCT/JP2013/068926
§ 371 (c)(1),
(2) Date: Dec. 18, 2014

(87) PCT Pub. No.: WO2014/007403
PCT Pub. Date: Jan. 9, 2014

(65) Prior Publication Data
US 2015/0191203 A1 Jul. 9, 2015

(30) Foreign Application Priority Data
Jul. 6, 2012 (JP) ................................. 2012-152707

(51) Int. Cl.
*B62D 21/15* (2006.01)
*B60R 19/02* (2006.01)
*B62D 21/02* (2006.01)

(52) U.S. Cl.
CPC .............. *B62D 21/152* (2013.01); *B60R 19/02* (2013.01); *B62D 21/02* (2013.01); *B60R 19/023* (2013.01)

(58) Field of Classification Search
CPC ............................ B62D 21/152; B60R 19/34
USPC ........................................ 296/187.1; 293/133
See application file for complete search history.

(56) References Cited

U.S. PATENT DOCUMENTS

| 6,318,775 | B1 | 11/2001 | Heatherington et al. |
| 8,608,231 | B1 * | 12/2013 | Mendivil et al. ......... 296/187.03 |
| 8,789,877 | B2 * | 7/2014 | Ohnaka et al. ........... 296/193.09 |
| 9,027,695 | B2 * | 5/2015 | Nakamura et al. ............ 180/247 |
| 9,061,713 | B2 * | 6/2015 | Hashimoto et al. |
| 2003/0090099 | A1 | 5/2003 | Miyasaka |

(Continued)

FOREIGN PATENT DOCUMENTS

| EP | 1 125 798 A2 | 8/2001 |
| JP | H04-011187 U | 1/1992 |

(Continued)

*Primary Examiner* — Jason S Morrow
(74) *Attorney, Agent, or Firm* — Oliff PLC

(57) ABSTRACT

A vehicle body front portion structure including a front side member disposed, with a longitudinal direction thereof being in a vehicle longitudinal direction, at a vehicle transverse direction outer side portion of a vehicle body front portion; a bumper reinforcement disposed, with a longitudinal direction thereof being in a vehicle transverse direction, at a vehicle front side of the front side member, and that is supported via a supporting member at a front end portion of the front side member; a plate portion whose plate thickness direction is in the vehicle longitudinal direction, and that extends toward a vehicle transverse direction outer side from the front end portion of the front side member; and a reinforcing member disposed at a vehicle rear side of the plate portion, and that, together with the plate portion, forms a closed cross-section as seen in a plan cross-section.

9 Claims, 3 Drawing Sheets

(56) References Cited

U.S. PATENT DOCUMENTS

| | | |
|---|---|---|
| 2007/0176443 A1 | 8/2007 | Yasuhara et al. |
| 2009/0256389 A1 | 10/2009 | Kosaka |
| 2012/0248820 A1* | 10/2012 | Yasui et al. ............. 296/187.09 |
| 2014/0008924 A1* | 1/2014 | Han et al. .................... 293/133 |
| 2014/0062106 A1* | 3/2014 | Han ............................ 293/133 |
| 2014/0091598 A1* | 4/2014 | Park et al. ................ 296/203.02 |
| 2014/0159420 A1* | 6/2014 | Hashimoto et al. ........ 296/187.1 |
| 2014/0167450 A1* | 6/2014 | Sotoyama et al. ....... 296/187.09 |
| 2014/0361559 A1* | 12/2014 | Sakakibara et al. .......... 293/133 |
| 2014/0361560 A1* | 12/2014 | Sakakibara et al. .......... 293/133 |
| 2015/0028606 A1* | 1/2015 | Eckert et al. ................. 293/133 |
| 2015/0069785 A1* | 3/2015 | Sakakibara et al. ....... 296/187.1 |
| 2015/0076862 A1* | 3/2015 | Abe et al. ................... 296/187.1 |
| 2015/0115653 A1* | 4/2015 | Ookubo et al. ............ 296/187.1 |

FOREIGN PATENT DOCUMENTS

| | | |
|---|---|---|
| JP | 2001-088633 A | 4/2001 |
| JP | 2002-225748 A | 8/2002 |
| JP | 2002-234409 A | 8/2002 |
| JP | 2003-146246 A | 5/2003 |
| JP | 2006137374 A | 6/2006 |
| JP | 2006-240322 A | 9/2006 |
| JP | 2007-190964 A | 8/2007 |
| JP | 2008-213739 A | 9/2008 |
| JP | 2008-222037 A | 9/2008 |

* cited by examiner

VEHICLE BODY FRONT PORTION STRUCTURE

FIELD OF THE INVENTION

The present invention relates to a vehicle body front portion structure.

DESCRIPTION OF THE RELATED ART

Conventionally, there is the technique disclosed in, for example, Japanese Patent Application Laid-Open No. 2008-213739 as a vehicle body front portion structure for adaptation to small overlap crashes.

That publication discloses a bumper structure having a bumper reinforcement, an extension that is extended toward the vehicle rear side from an end portion at the vehicle transverse direction outer side of the bumper reinforcement and is disposed at the vehicle transverse direction outer side of a front side member, and a convex portion that is provided at this extension and is formed so as to be convex toward the front side member side.

SUMMARY OF THE INVENTION

Technical Subject

At a vehicle body that is equipped with such a vehicle body front portion structure, there are cases in which it is desirable to generate lateral force with respect to the vehicle body at the time of a small overlap crash, in order to react to small overlap crashes.

Thus, a subject of the present invention is to provide a vehicle body front portion structure that can generate lateral force with respect to a vehicle body at the time of a small overlap crash.

Solution Addressing the Subject

In order to address the above-described subject, a vehicle body front portion structure of a first aspect of the present invention comprises: a front side member that is disposed, with a longitudinal direction thereof being in a vehicle longitudinal direction, at a vehicle transverse direction outer side portion of a vehicle body front portion; a bumper reinforcement that is disposed, with a longitudinal direction thereof being in a vehicle transverse direction, at a vehicle front side of the front side member, and that is supported via a supporting member at a front end portion of the front side member; a plate portion whose plate thickness direction is in the vehicle longitudinal direction, and that extends toward a vehicle transverse direction outer side from the front end portion of the front side member; and a reinforcing member that is disposed at a vehicle rear side of the plate portion, and that, together with the plate portion, forms a closed cross-section as seen in a plan cross-section.

In accordance with the vehicle body front portion structure, the plate portion, whose plate thickness direction is in the vehicle longitudinal direction, extends toward the vehicle transverse direction outer side from the front end portion of the front side member. Further, the reinforcing member is provided at the vehicle rear side of this plate portion, and the reinforcing member, together with the plate portion, forms a closed cross-section as seen in a plan cross-section.

Further, at the time of a small overlap crash, when collision load toward the vehicle rear side is applied from a collision body to the plate portion, the plate portion is bendingly deformed toward the vehicle rear side. Further, when the plate portion is bendingly deformed in this way, the reinforcing member contacts a side wall portion at the vehicle transverse direction outer side of the front side member, and the plate portion is supported in a bendingly-deformed state, i.e., a state of being tilted so as to head toward the vehicle transverse direction outer side while heading toward the vehicle rear side.

Accordingly, due to collision load toward the vehicle rear side being applied from the collision body to the tilted plate portion, a component of force toward the vehicle transverse direction inner side is applied to the plate portion. As a result, lateral force can be generated with respect to the vehicle body (in particular, the cabin or the engine) at the time of a small overlap crash.

A vehicle body front portion structure of a second aspect of the present invention is structured such that, in the first aspect, the vehicle body front portion structure further comprises a plate-shaped member that is sandwiched between the supporting member and the front side member, and the plate portion is formed at the plate-shaped member.

In accordance with this vehicle body front portion structure, the plate portion is formed at the plate-shaped member that is sandwiched between the supporting member and the front side member. Accordingly, in order to dispose the plate portion at the vehicle body front portion, it suffices to sandwich the plate-shaped member, that has the plate portion, between the supporting member and the front side member. Therefore, the plate portion can easily be disposed at the vehicle body front portion.

Further, the holding rigidity for the plate portion also can be ensured due to the plate portion being formed at the plate-shaped member that is sandwiched between the supporting member and the front side member in this way.

A vehicle body front portion structure of a third aspect of the present invention is structured such that, in the first aspect or the second aspect, the reinforcing member projects out toward a vehicle rear side from the plate portion, and a rear end portion of the reinforcing member is made to be a free end.

In accordance with this vehicle body front portion structure, the rear end portion of the reinforcing member is made to be a free end. Accordingly, at the time of a small overlap crash, it can be suppressed that the plate portion at which this reinforcing member is provided is impeded to be bent and deformed, and therefore, the plate portion can be bendingly deformed smoothly.

A vehicle body front portion structure of a fourth aspect of the present invention is structured such that, in any of the first aspect through the third aspect, a position at which the plate portion is disposed is set such that a front wheel is positioned outside of a range of a rotational locus of the plate portion in a case in which the plate portion bendingly deforms toward a vehicle rear side with a proximal end portion thereof as a bending point.

In accordance with this vehicle body front portion structure, the position at which the plate portion is disposed is set such that the front wheel is positioned outside of the range of the rotational locus of the plate portion in a case in which the plate portion bendingly deforms toward the vehicle rear side with the proximal end portion thereof being the bending point. Accordingly, even in a case in which the plate portion is bendingly deformed at the time of a small overlap crash, interference between the plate portion and the front wheel can be avoided. Due thereto, the plate portion can be bendingly deformed smoothly.

A vehicle body front portion structure of a fifth aspect of the present invention is structured such that, in any of the first aspect through the fourth aspect, the reinforcing member is formed in a taper shape whose width in the vehicle transverse direction becomes narrower toward a vehicle rear side.

When a state of the collision proceeds from the state in which the plate portion is bendingly deformed and the rear end portion of the reinforcing member contacts the side wall portion at the vehicle transverse direction outer side of the front side member as described above, inertial force from the vehicle body rear portion increases. Here, at this vehicle body front portion structure, the reinforcing member is formed in a taper shape whose width in the vehicle transverse direction becomes narrower toward the vehicle rear side. Accordingly, when inertial force from the vehicle body rear portion increases, stress can be concentrated in a vicinity of a portion where the front side member contacts the rear end portion of the reinforcing member, and a portion at the front end portion side of this front side member can be bent toward the vehicle transverse direction outer side with the contacting portion vicinity being the bending point. As a result, because the component of force that is applied toward the vehicle transverse direction inner side to the plate portion increases, the lateral force that is applied to the vehicle body (in particular, the cabin or the engine) at the time of a small overlap crash can be increased.

Further, when collision load is applied to the plate portion in the state in which the plate portion has bendingly deformed and the rear end portion of the reinforcing member contacts the side wall portion, a moment toward the vehicle transverse direction inner side is generated with respect to the portion at the front end portion side of the front side member, as described above. However, due to the portion at the front end portion side of the front side member being bent toward the vehicle transverse direction outer side as described above, a moment toward the vehicle transverse direction outer side is generated, and the aforementioned moment toward the vehicle transverse direction inner side can be reduced by this moment toward the vehicle transverse direction outer side. Due thereto, rotation of the vehicle can be suppressed.

A vehicle body front portion structure of a sixth aspect of the present invention is structured such that, in any of the first aspect through the fifth aspect, the reinforcing member is formed in a triangular shape in plan view that is formed so as to be convex toward a vehicle rear side.

In accordance with this vehicle body front portion structure, the reinforcing member is formed in a triangular shape in plan view that is formed so as to be convex toward the vehicle rear side. Accordingly, when collision load is applied to the plate portion in the state in which the rear end portion (the vertex portion) of the reinforcing member contacts the side wall portion of the front side member, stress can be concentrated more at the contacting portion vicinity of the front side member that contacts the rear end portion of this reinforcing member. Due thereto, the portion at the front end portion side of the front side member can be bent smoothly toward the vehicle transverse direction outer side.

A vehicle body front portion structure of a seventh aspect of the present invention is structured such that, in any of the first aspect through the sixth aspect, the plate portion projects out further toward a vehicle transverse direction outer side than the bumper reinforcement.

In accordance with this vehicle body front portion structure, the plate portion projects out further toward the vehicle transverse direction outer side than the bumper reinforcement. Accordingly, at the time of a small overlap crash, interference between the bumper reinforcement and the plate portion is suppressed, and collision load from the collision body can be smoothly applied to the plate portion.

A vehicle body front portion structure of an eighth aspect of the present invention is structured such that, in any of the first aspect through the seventh aspect, the reinforcing member has a ceiling wall portion and a bottom wall portion that are respectively formed in triangular shapes in plan view that are formed so as to be convex toward a vehicle rear side, and that oppose one another in a vehicle vertical direction. A height, in the vehicle vertical direction, of the ceiling portion coincides with that of an upper side ridgeline portion that extends in the vehicle longitudinal direction along an upper wall portion of the front side member. A height, in the vehicle vertical direction, of the bottom wall portion coincides with that of a lower side ridgeline portion that extends in the vehicle longitudinal direction along a lower wall portion of the front side member.

In accordance with this vehicle body front portion structure, the height, in the vehicle vertical direction, of the ceiling wall portion of the reinforcing member coincides with that of the upper side ridgeline portion that extends in the vehicle longitudinal direction along the upper wall portion of the front side member. The height, in the vehicle vertical direction, of the bottom wall portion of the reinforcing member coincides with that of the lower side ridgeline portion that extends in the vehicle longitudinal direction along the lower wall portion of the front side member. Accordingly, when collision load is applied to the plate portion in the state in which the rear end portion of the reinforcing member contacts the side wall portion at the vehicle transverse direction outer side of the front side member, stress is concentrated at the upper side ridgeline portion and the lower side ridgeline portion at the front side member by the ceiling wall portion and the bottom wall portion of the reinforcing member, and these upper side ridgeline portion and lower side ridgeline portion can be bent.

A vehicle body front portion structure of a ninth aspect of the present invention is structured such that, in the eighth aspect, the upper wall portion of the front side member has an upper-outer side ridgeline portion that extends in the vehicle longitudinal direction along an end portion at a vehicle transverse direction outer side, and an upper-inner side ridgeline portion that extends in the vehicle longitudinal direction along an end portion at a vehicle transverse direction inner side. The height, in the vehicle vertical direction, of the ceiling wall portion coincides with that of at least the upper-outer side ridgeline portion that serves as the upper side ridgeline portion. The lower wall portion of the front side member has a lower-outer side ridgeline portion that extends in the vehicle longitudinal direction along an end portion at a vehicle transverse direction outer side, and a lower-inner side ridgeline portion that extends in the vehicle longitudinal direction along an end portion at a vehicle transverse direction inner side. The height, in the vehicle vertical direction, of the bottom wall portion coincides with that of at least the lower-outer side ridgeline portion that serves as the lower side ridgeline portion.

In accordance with this vehicle body front portion structure, the height, in the vehicle vertical direction, of the ceiling wall portion coincides with that of at least the upper-outer side ridgeline portion among the upper-outer side ridgeline portion and the upper-inner side ridgeline portion. The height, in the vehicle vertical direction, of the bottom wall portion coincides with that of at least the lower-outer side ridgeline portion among the lower-outer side ridgeline portion and the lower-inner side ridgeline portion. Accordingly, when collision load is applied to the plate portion in the state in which the rear end portion of the reinforcing member contacts the side wall portion at the vehicle transverse direction outer side of the front side member, at least the upper-outer side ridgeline portion and the lower-outer side ridgeline portion (the ridgeline portions that are positioned at the inner side of the proximal end portion of the plate portion) can be bent. Therefore, the portion at the front end portion side of the front side member can be bent more smoothly toward the vehicle transverse direction outer side.

A vehicle body front portion structure of a tenth aspect of the present invention is structured such that, in the eighth aspect or the ninth aspect, the reinforcing member has an outer side vertical wall portion that connects oblique side portions at a vehicle transverse direction outer side of the ceiling wall portion and the bottom wall portion. The reinforcing member also has an inner side vertical wall portion that connects oblique side portions at a vehicle transverse direction inner side of the ceiling wall portion and the bottom wall portion. A rear end portion of the reinforcing member is made to be a rear side ridgeline portion that extends in the vehicle vertical direction and is formed by a connected portion of the outer side vertical wall portion and the inner side vertical wall portion.

In accordance with this vehicle body front portion structure, the rear end portion of the reinforcing member is made to be the rear side ridgeline portion that extends in the vehicle vertical direction and that is formed by the connecting portion of the outer side vertical wall portion and the inner side vertical wall portion. Accordingly, this rear side ridgeline portion, that has high rigidity and a narrow width, can be made to abut the side wall portion at the vehicle transverse direction outer side of the front side member over the vehicle vertical direction. Due thereto, the portion at the front end portion side of the front side member can be bent more smoothly toward the vehicle transverse direction outer side.

Advantageous Effects of Invention

As described above in detail, in accordance with the present invention, lateral force can be generated with respect to a vehicle body at the time of a small overlap crash.

DETAILED DESCRIPTION OF THE INVENTION

An embodiment of the present invention is described hereinafter with reference to the drawings.

Note that arrow UP, arrow FR and arrow OUT shown in the respective drawings indicate a vehicle vertical direction upper side, a vehicle longitudinal direction front side and a vehicle transverse direction outer side (the vehicle left side), respectively.

Figure 1:
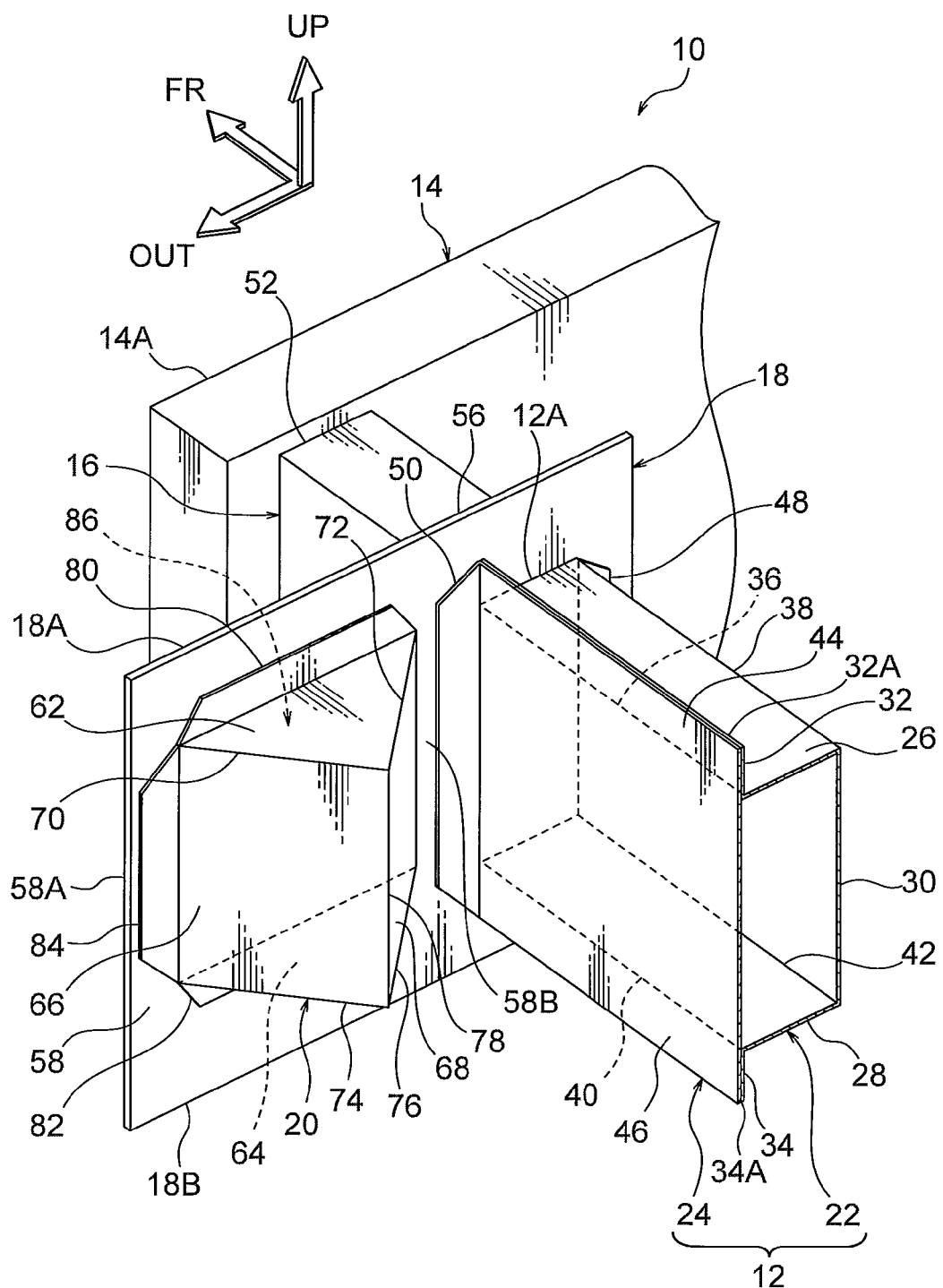
FIG. 1 is a perspective view of a vehicle body front portion structure relating to an embodiment of the present invention.
Figure 2:
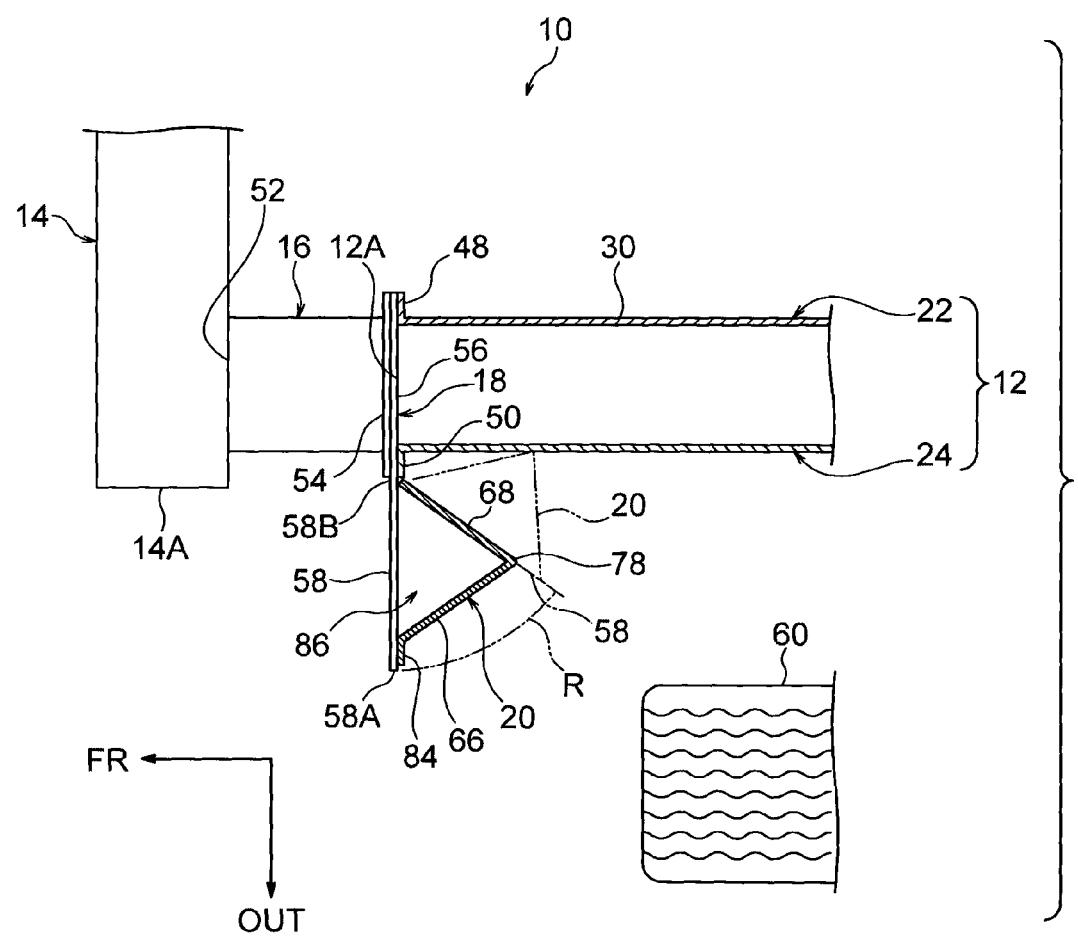
FIG. 2 is a plan view that includes a partial cross-section of the vehicle body front portion structure shown in FIG. 1.

A vehicle body front portion structure 10, that relates to an embodiment of the present invention and is shown in FIG. 1 and FIG. 2, is a structure that is applied to the front portion of a vehicle body that is provided at a vehicle such as a passenger automobile or the like for example. This vehicle body front portion structure 10 has a front side member 12, a bumper reinforcement 14, a crush box 16, a plate-shaped member 18, and a reinforcing member 20.

The front side member 12 is disposed at a vehicle transverse direction outer side portion of the vehicle body front portion, with a longitudinal direction thereof being in the vehicle longitudinal direction. The front side member 12 has a side member inner 22 and a side member outer 24 that are divided in the vehicle transverse direction.

The side member inner 22 is formed in a hat shape in cross-section that opens toward the vehicle transverse direction outer side. Namely, this side member inner 22 has an upper wall portion 26, a lower wall portion 28, a side wall portion 30, an upper side flange 32 and a lower side flange 34. Plate thickness directions of the upper wall portion 26 and the lower wall portion 28 are respectively in the vehicle vertical direction, and the upper wall portion 26 and the lower wall portion 28 oppose one another in the vehicle vertical direction. The side wall portion 30 extends in the vehicle vertical direction with a plate thickness direction thereof being in the vehicle transverse direction, and connects end portions, at vehicle transverse direction inner sides, of the upper wall portion 26 and the lower wall portion 28.

The upper flange 32 projects out toward the vehicle upper side from an end portion at the vehicle transverse direction outer side of the top wall portion 26. The lower flange 34 projects out toward the vehicle lower side from an end portion at a vehicle transverse direction outer side of the lower wall portion 28. This upper side flange 32 and lower side flange 34 extend in elongated shapes in the vehicle longitudinal direction with a plate thickness directions thereof being in the vehicle transverse direction.

Further, a connected portion of the upper side flange 32 and the upper wall portion 26 is made to be an upper-outer side ridgeline portion 36, and a connected portion of the upper wall portion 26 and the side wall portion 30 is made to be an upper-inner side ridgeline portion 38. Heights in the vehicle vertical direction of these upper-outer side ridgeline portion 36 and upper-inner side ridgeline portion 38 coincide with one another, and the upper-outer side ridgeline portion 36 and upper-inner side ridgeline portion 38 extend in the vehicle longitudinal direction along the upper wall portion 26. Similarly, a connected portion of the lower side flange 34 and the lower wall portion 28 is made to be a lower-outer side ridgeline portion 40, and a connected portion of the lower wall portion 28 and the side wall portion 30 is made to be a lower-inner side ridgeline portion 42. Heights in the vehicle vertical direction of these lower-outer side ridgeline portion 40 and lower-inner side ridgeline portion 42 coincide with one another, and the lower-outer side ridgeline portion 40 and lower-inner side ridgeline portion 42 extend in the vehicle longitudinal direction along the lower wall portion 28.

Note that the upper-outer side ridgeline portion 36 and the upper-inner side ridgeline portion 38 are examples of the upper side ridgeline portion, and the lower-outer side ridgeline portion 40 and the lower-inner side ridgeline portion 42 are examples of the lower side ridgeline portion.

The side member outer 24 is formed in the shape of a flat plate whose plate thickness direction is in the vehicle transverse direction. An upper end portion 44 of the side member outer 24 is joined to the upper side flange 32 in a state of being superposed with the upper side flange 32 in the vehicle transverse direction. Similarly, a lower end portion 46 of the side member outer 24 is joined to the lower side flange 34 in a state of being superposed with the lower side flange 34 in the vehicle transverse direction.

Further, a front side flange 48, that projects out toward the vehicle transverse direction inner side, is formed at a front end portion of the aforementioned side wall portion 30. A front side flange 50, that projects out toward the vehicle transverse direction outer side, is formed at a front end portion of the side member outer 24. These front side flanges 48, 50 extend in elongated shapes in the vehicle vertical direction with plate thickness directions thereof being in the vehicle longitudinal direction.

The bumper reinforcement 14 is disposed at a front side of the front side member 12 with a longitudinal direction thereof being in the vehicle transverse direction. This bumper reinforcement 14 supports an unillustrated bumper cover that is provided at a front end portion of the vehicle. An end portion 14A at the vehicle transverse direction outer side of this bumper reinforcement 14 is positioned at a location which is extended in a vehicle front side from a front end portion 12A of the front side member 12.

The crush box 16 is an example of a supporting member. The crush box 16 is formed of resin for example, and has an impact absorbing ability due to the provision of a space portion or the like at the interior thereof. The crush box 16 is disposed between the end portion 14A of the bumper reinforcement 14 and the front end portion 12A of the front side member 12. Further, the crush box 16 supports the end portion 14A of the bumper reinforcement 14 with respect to the front end portion 12A of the front side member 12.

Namely, a mounting portion 52 is formed at a front end portion of the crush box 16. The mounting portion 52 is fixed to the end portion 14A at the vehicle transverse direction outer side of the bumper reinforcement 14. On the other hand, a rear side flange 54, whose plate thickness direction is in the vehicle longitudinal direction, is formed at a rear end portion of the crush box 16. A main body portion 56 of the plate-shaped member 18 that is described later is superposed with the rear side flange 54 from the vehicle rear side, and the aforementioned front side flanges 48, 50 are superposed with the main body portion 56 from the vehicle rear side. Further, these rear side flange 54, main body portion 56, and front side flanges 48, 50 are joined in a state of being superposed in the vehicle longitudinal direction.

The plate-shaped member 18 is disposed with a plate thickness direction thereof being in the vehicle longitudinal direction, and has the main body portion 56 and a plate portion 58. The main body portion 56 is sandwiched between the crush box 16 and the front side member 12 as described above.

The plate portion 58 is extended from the main body portion 56 toward the vehicle transverse direction outer side (in other words, extends toward the outer side from the front end portion 12A of the front side member 12 that is joined to the main body portion 56). The plate portion 58 projects out further toward the vehicle transverse direction outer side than the bumper reinforcement 14. An end portion 58A at the vehicle transverse direction outer side of the plate portion 58 is made to be a free end.

Note that the following forms are included in the description that "the plate portion 58 projects out further toward the vehicle transverse direction outer side than the bumper reinforcement 14" indicated as above. Namely, a first form is a case in which the entirety from a proximal end portion 58B of the plate portion 58 to the end portion 58A at the vehicle transverse direction outer side is positioned further toward the vehicle transverse direction outer side than the end portion 14A of the bumper reinforcement 14. Further, a second form is a case in which the proximal end portion 58B of the plate portion 58 is positioned further toward the vehicle transverse direction inner side than the end portion 14A of the bumper reinforcement 14, but a portion, of the plate portion 58, that is at an end portion 58A side than the proximal end portion 58B is positioned further toward the vehicle transverse direction outer side than the end portion 14A of the bumper reinforcement 14.

As will be described later, since the plate portion 58 receives collision load toward the vehicle rear side from a collision body at the time of a small overlap crash, the plate portion 58 bendingly deforms toward the vehicle rear side with the proximal end portion 58B thereof being a bending point (see FIG. 3). Here, as shown in FIG. 2, a front wheel 60 is disposed at the vehicle rear side and the vehicle transverse direction outer side of the plate portion 58. In the event that this front wheel 60 and the plate portion 58 are disposed so as to be close to one another, there is the concern that the front wheel 60 and the plate portion 58 will interfere with one another and the bending deformation of the plate portion 58 will be impeded.

Thus, in the present embodiment, given that a range of the rotational locus of the plate portion 58, in a case in which the plate portion 58 bendingly deforms toward the vehicle rear side with the proximal end portion 58B thereof as the bending point, is rotational range R, the position at which the plate portion 58 is disposed is set such that the front wheel 60 is positioned outside of this rotational range R. Namely, the plate portion 58 is set apart such that a sufficient distance is maintained at the vehicle front side and at the vehicle transverse direction inner side with respect to the front wheel 60.

Further, as shown in FIG. 1, an upper end portion 18A of the plate-shaped member 18 is positioned further toward the vehicle upper side than an upper end portion of the front side member 12 (a distal end portion 32A of the upper side flange 32). Similarly, a lower end portion 18B of the plate-shaped member 18 is positioned further toward the vehicle lower side than a lower end portion of the front side member 12 (a distal end portion 34A of the lower side flange 34).

The reinforcing member 20 is provided at the vehicle rear side of the plate portion 58. The reinforcing member 20 projects out toward the vehicle rear side from the plate portion 58, and is formed in a taper shape whose width in the vehicle transverse direction becomes narrower toward the vehicle rear side.

More concretely, this reinforcing member 20 has a ceiling wall portion 62 and a bottom wall portion 64 that oppose one another in the vehicle vertical direction, and an outer side vertical wall portion 66 and an inner side vertical wall portion 68 that are formed between the ceiling wall portion 62 and bottom wall portion 64. The ceiling wall portion 62 and the bottom wall portion 64 are respectively formed in triangular shapes in plan view that are formed so as to be convex toward the vehicle rear side. Namely, this ceiling wall portion 62 and bottom wall portion 64 are formed in roughly isosceles triangle shapes having the base at the vehicle front side and the vertex at the vehicle rear side. Due thereto, the reinforcing member 20 is formed in a triangular shape in plan view that is formed so as to be convex toward the vehicle rear side.

The outer side vertical wall portion 66 extends in the vehicle vertical direction, and connects oblique side portions at the vehicle transverse direction outer sides of the ceiling wall portion 62 and the bottom wall portion 64. The inner side vertical wall portion 68 extends in the vehicle vertical direction, and connects oblique side portions at the vehicle transverse direction inner sides of the ceiling wall portion 62. and the bottom wall portion 64. A connected portion of the ceiling wall portion 62 and the outer side vertical wall portion 66 is made to be an upper-outer side ridgeline portion 70, and a connected portion of the ceiling portion 62 and the inner side vertical wall portion 68 is made to be an upper-inner side ridgeline portion 72. Similarly, a connected portion of the bottom wall portion 64 and the outer side vertical wall portion 64 is made to be a lower-outer side ridgeline portion 74, and a connected portion of the bottom wall portion 64 and the inner side vertical wall portion 68 is made to be a lower-inner side ridgeline portion 76. These upper-outer side ridgeline portion 70, upper-inner side ridgeline portion 72, lower-outer side ridgeline portion 74 and lower-inner side ridgeline portion 76 extend orthogonally to the vehicle vertical direction.

Further, a connected portion of the outer side vertical wall portion 66 and the inner side vertical wall portion 68 is made to be a rear side ridgeline portion 78. This rear side ridgeline portion 78 is formed at a rear end portion of the reinforcing member 20, and extends in the vehicle vertical direction. The rear side ridgeline portion 78 that is formed in this reinforcing member 20 is made to be a free end.

Further, an upper side flange 80 that projects out toward the vehicle upper side is formed at a front end portion of the ceiling wall portion 62. A lower side flange 82 that projects out toward the vehicle lower side is formed at a front end portion of the bottom wall portion 64. These upper side flange 80 and lower side flange 82 extend in elongated shapes in the vehicle transverse direction with a plate thickness directions thereof being in the vehicle longitudinal direction. Further, an outer side flange 84 that projects out toward the vehicle transverse direction outer side is formed at an end portion at the vehicle transverse direction outer side of the outer side vertical wall portion 66. This outer side flange 84 extends in an elongated shape in the vehicle vertical direction with a plate thickness direction thereof being in the vehicle longitudinal direction.

Further, these upper side flange 80, lower side flange 82 and outer side flange 84 are joined to the aforementioned plate portion 58 in a state of being superposed with the plate portion 58 from the vehicle rear side. Further, of the reinforcing member 20 that is fixed to the plate portion 58 in this way, the outer side vertical wall portion 66 and the inner side vertical wall portion 68 form, together with this plate portion 58, a closed-cross section 86 that is triangular as seen in a plan cross-section, further toward the vehicle transverse direction outer side than the proximal end portion 58B of the plate portion 58 (see FIG. 2).

Further, the reinforcing member 20 that together with the plate portion 58 forms the closed cross-section 86 in this way, is set apart, in the vehicle transverse direction, from the side wall portion (the side member outer 24) at the vehicle transverse direction outer side of the front side member 12. Further, the reinforcing member 20 is positioned further toward the vehicle front side and the vehicle transverse direction inner side than the front wheel 60.

Moreover, a height in the vehicle vertical direction of the ceiling wall portion 62 (in other words, the upper-outer side ridgeline portion 70 and the upper-inner side ridgeline portion 72) of the reinforcing member 20 coincides with that of the upper-outer side ridgeline portion 36 and the upper-inner side ridgeline portion 38 that are formed along the upper wall portion 26 of the front side member 12. Similarly, a height in the vehicle vertical direction of the bottom wall portion 64 (in other words, the lower-outer side ridgeline portion 74 and the lower-inner side ridgeline portion 76) of this reinforcing member 20 coincides with that of the lower-outer side ridgeline portion 40 and the lower-inner side ridgeline portion 42 that are formed along the lower wall portion 28 of the front side member 12.

The operation and effects of the embodiment of the present invention are described next.

As described in detail above, in accordance with the vehicle body front portion structure 10 relating to the embodiment of the present invention, the plate portion 58, whose plate thickness direction is made to be in the vehicle longitudinal direction, extends toward the vehicle transverse direction outer side from the front end portion 12A of the front side member 12 (more concretely, the plate portion 58 extends from the main body portion 56 of the plate-shaped member 18 that is joined to the front end portion 12A). Further, the reinforcing member 20 is provided at the rear side of the plate portion 58, and the reinforcing member 20, together with the plate portion 58, forms the closed cross-section 86 as seen in a plan cross-section.

Figure 3:
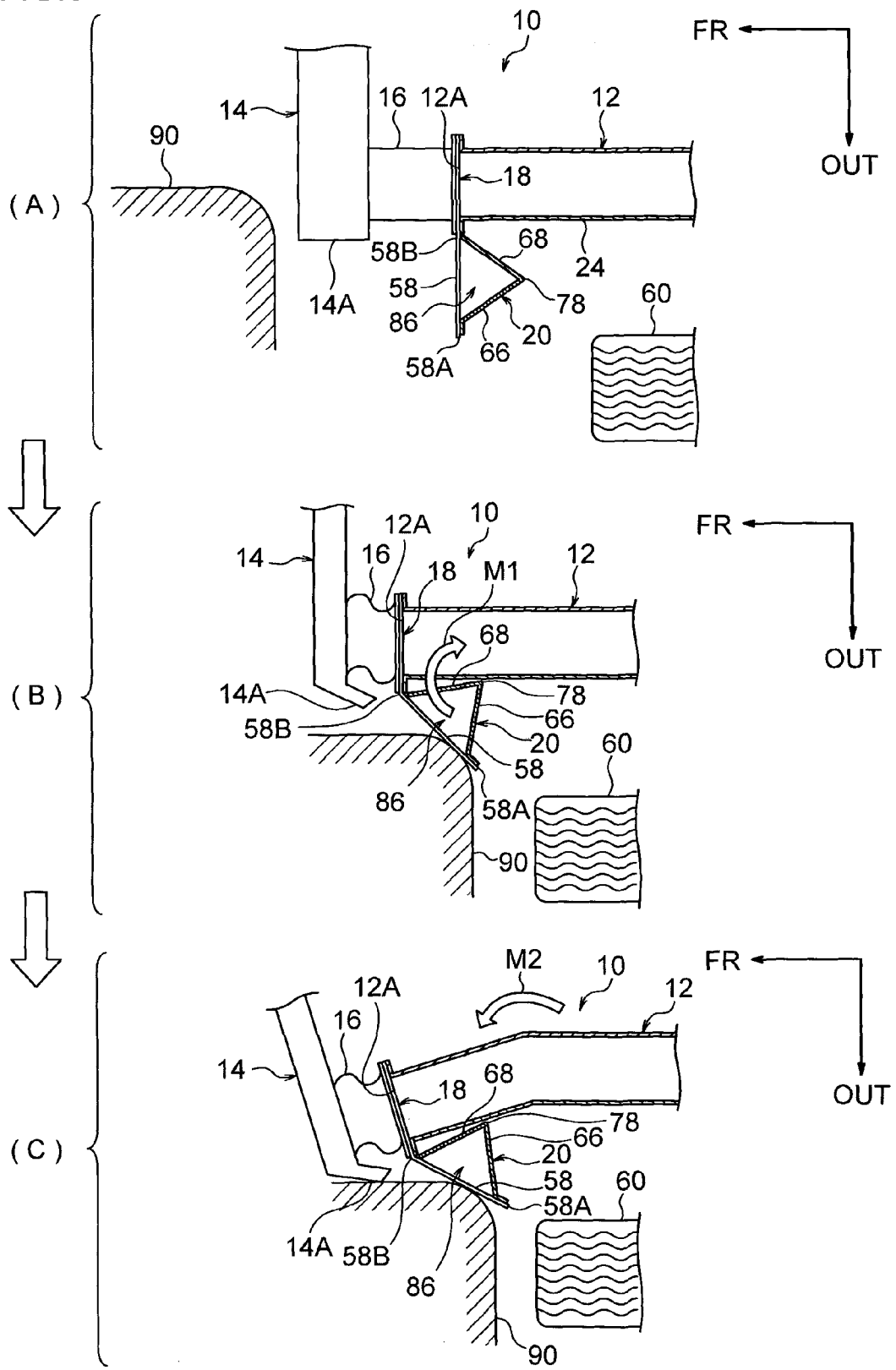
FIG. 3 is a drawing that explains the state at the time when a small overlap crash occurs with respect to the vehicle body front portion structure shown in FIG. 1.

Further, as shown in (A) through (B) of FIG. 3, in the event that a small overlap crash, in which a collision body 90 (e.g., a rigid wall) collides with the front side end portion of the vehicle, occurs, the end portion 14A at the vehicle transverse direction outer side of the bumper reinforcement 14 is bendingly deformed toward the vehicle rear side, and the crush box 16 is compressively deformed.

Further, when collision load toward the vehicle rear side is applied from the collision body 90 to the plate portion 58, the plate portion 58 is bendingly deformed toward the vehicle rear side with the proximal end portion 58B thereof being the bending point. Namely, a strength of the proximal end portion 58B of the plate portion 58 is lower than that of the portion of the plate portion 58 that is reinforced by the reinforcing member 20 (the portion between the end portion 58A and the proximal end portion 58B), and therefore, the proximal end portion 58B of the plate portion 58 becomes the bending point of the bending deformation.

Further, when the plate portion 58 is bendingly deformed in this way, there becomes a state in which the reinforcing member 20 contacts the side wall portion (the side member outer 24) at the vehicle transverse direction outer side of the front side member 12, and the plate portion 58 has been bendingly deformed. Namely, the plate portion 58 is held in a state of being tilted toward the vehicle transverse direction outer side while heading toward the vehicle rear side.

Accordingly, due to collision load toward the vehicle rear side being further applied from the collision body 90 to the plate portion 58 that has been tilted, a component of force toward the vehicle transverse direction inner side is applied to the plate portion 58. As a result, lateral force can be generated with respect to the vehicle body (in particular, the cabin or the engine) at the time of a small overlap crash.

Further, when the state of the collision proceeds from the state in which the plate portion 58 is bendingly deformed and the rear end portion of the reinforcing member 20 contacts the side member outer 24 as described above, inertial force from the vehicle body rear portion increases. Here, at this vehicle body front portion structure 10, the reinforcing member 20 is formed in a taper shape whose width in the vehicle transverse direction becomes narrower toward the vehicle rear side. Accordingly, when the inertial force from the vehicle body rear portion increases, as shown in (C) of FIG. 3, stress can be concentrated in a vicinity of a portion where the front side member 12 contacts the rear end portion of the reinforcing member 20, and the portion at the front end portion 12A side of the front side member 12 can be bent toward the vehicle transverse direction outer side with this contacting portion vicinity being the bending point.

As a result, because a component of force that is applied toward the vehicle transverse direction inner side to the plate portion 58 increases, the lateral force that is applied to the vehicle body (in particular, the cabin or the engine) at the time of a small overlap crash can be increased.

Further, in the state in which the plate portion 58 has bendingly deformed and the rear end portion of the reinforcing member 20 contacts the side member outer 24, when collision load is applied to the plate portion 58, a moment M1 toward the vehicle transverse direction inner side is generated with respect to the portion at the front end portion 12A side of the front side member 12, as described above. However, due to the portion at the front end portion 12A side of the front side member 12 being bent toward the vehicle transverse direction outer side as described above also, a moment M2 toward the vehicle transverse direction outer side is generated, and the aforementioned moment M1 toward the vehicle transverse direction inner side can be reduced by this moment M2 toward the vehicle transverse direction outer side. Due thereto, rotation of the vehicle can be suppressed.

Moreover, the reinforcing member 20 is formed in a triangular shape in plan view that is formed so as to be convex toward the vehicle rear side. Accordingly, when collision load is applied to the plate portion 58 in the state in which the rear end portion of the reinforcing member 20 contacts the side member outer 24, stress can be concentrated more in the vicinity of the contacting portion of the front side member 12 that contacts the rear end portion (vertex portion) of this reinforcing member 20. Due thereto, the portion at the front end portion 12A side of this front side member 12 can be bent smoothly toward the vehicle transverse direction outer side.

Further, the rear end portion of the reinforcing member 20 is made to be the rear side ridgeline portion 78 that is formed by the connecting portion of the outer side vertical wall portion 66 and the inner side vertical wall portion 68 and that extends in the vehicle vertical direction. Accordingly, this rear side ridgeline portion 78, that has high rigidity and a narrow width, can be made to abut the side member outer 24 over the vehicle vertical direction. Due thereto, the portion at the front end portion 12A side of the front side member 12 can be bent more smoothly toward the vehicle transverse direction outer side.

Further, as shown in FIG. 1, the height, in the vehicle vertical direction, of the ceiling wall portion 62 of the reinforcing member 20 coincides with those of the upper-outer side ridgeline portion 36 and the upper-inner side ridgeline portion 38 that extend in the vehicle longitudinal direction along the upper wall portion 26 of the front side member 12. Similarly, the height, in the vehicle vertical direction, of the bottom wall portion 64 of the reinforcing member coincides with those of the lower-outer side ridgeline portion 40 and the lower-inner side ridgeline portion 42 that extend in the vehicle longitudinal direction along the lower wall portion 28 of the front side member 12. Accordingly, when collision load is applied to the plate portion 58 in the state in which the rear end portion of the reinforcing member 20 contacts the side member outer 24, stress is concentrated at the aforementioned upper-outer side ridgeline portion 36 and upper-inner side ridgeline portion 38, as well as lower-outer side ridgeline portion 40 and lower-inner side ridgeline portion 42, by the ceiling wall portion 62 and the bottom wall portion 64, and these ridgeline portions of the front side member 12 can be bent.

In particular, the height, in the vehicle vertical direction, of the ceiling wall portion 62 coincides with the height of at least the upper-outer side ridgeline portion 36 within the upper-outer side and upper-inner side ridgeline portions 36 and 38. The height, in the vehicle vertical direction, of the bottom wall portion 64 coincides with the height of at least the lower-outer side ridgeline portion 40 within the lower-outer side and lower inner-side ridgeline portions 40 and 42. Accordingly, when collision load is applied to the plate portion 58 in the state in which the rear end portion of the reinforcing member 20 contacts the side member outer 24, at least the upper-outer side ridgeline portion 36 and the lower-outer side ridgeline portion 40 (the ridgeline portions that are positioned at the inner side from the proximal end portion 58B) can be bent. Due thereto, the portion at the front end portion 12A side of the front side member 12 can be bent more smoothly toward the vehicle transverse direction outer side.

Further, the end portion 58A at the vehicle transverse direction outer side of the plate portion 58 is made to be a free end. Accordingly, at the time of a small overlap crash, impeding of the bending deformation of the plate portion 58 can be suppressed, and therefore, the plate portion 58 can be bendingly deformed smoothly. Further, by making the end portion 58A of the plate portion 58 be a free end (in other words, not fixing the end portion 58A to the front side member 12), the axial compressive deformation of the front side member 12 at a time of a front collision can be ensured.

Similarly, the rear side ridgeline portion 78 that is the rear end portion of the reinforcing member 20 also is made to be a free end. Accordingly, at the time of a small overlap crash, impeding of the bending deformation of the plate portion 58 at which this reinforcing member 20 is provided can be suppressed. Due thereto as well, the plate portion 58 can be bendingly deformed smoothly.

Further, the position at which the plate portion 58 is disposed is set such that the front wheel 60 is positioned outside of the rotational range R of the rotational locus of the plate portion 58 when the plate portion 58 is bendingly deformed toward the vehicle rear side with the proximal end portion 58B thereof as the bending point. Accordingly, even when the plate portion 58 is bendingly deformed at the time of a small overlap crash, interference between the plate portion 58 and the front wheel 60 can be avoided. Due thereto, the plate portion 58 can be bendingly deformed smoothly.

Moreover, the plate portion 58 projects out further toward the vehicle transverse direction outer side than the bumper reinforcement 14. Accordingly, at the time of a small overlap crash, interference between the bumper reinforcement 14 and the plate portion 58 is suppressed, and the collision load from the collision body 90 can be applied smoothly to the plate portion 58 (see FIG. 3).

Further, the plate portion 58 is formed at the plate-shaped member 18 that is sandwiched between the crush box 16 and the front side member 12. Accordingly, in order to dispose the plate portion 58 at the vehicle body front portion, it suffices for the plate-shaped member 18 that has the plate portion 58 to be sandwiched between the crush box 16 and the front side member 12, and the plate portion 58 can be easily disposed at the vehicle body front portion.

Further, the holding rigidity for the plate portion 58 also can be ensured due to the plate portion 58 being formed at the plate-shaped member 18 that is sandwiched between the crush box 16 and the front side member 12 in this way.

Modified examples of the embodiment of the present invention are described next.

In the above-described embodiment, the plate portion 58, whose plate thickness direction is in the vehicle longitudinal direction, was formed at the plate-shaped member 18 that is sandwiched between the crush box 16 and the front side member 12. However, the plate portion 58 may extend-out toward the vehicle transverse direction outer side from the front end portion 12A of the front side member 12 by, for example, being formed integrally with the side member outer 24 or the like.

Further, instead of the crush box 16 that is made of resin and has an impact absorbing ability, a supporting member (e.g., a bracket) made of metal may be provided, and the plate portion 58 may be formed integrally with this supporting member. Due thereto, the plate portion 58 may extend-out toward the vehicle transverse direction outer side from the front end portion 12A of the front side member 12.

Further, the end portion 58A at the vehicle transverse direction outer side of the plate portion 58 was made to be a free end. However, for example, the end portion 58A of the plate portion 58 may be made to be a fixed end provided that, for example, bending deformation of the plate portion 58 can be permitted. Similarly, the rear end portion of the reinforcing member 20 as well may be made to be a fixed end provided that bending deformation of the plate portion 58 can be permitted. It is preferable that the member that fixes the end portion 58A at the vehicle transverse direction outer side of this plate portion 58 be a member having low strength such that it easily deforms or breaks or the like, so that bending deformation of the plate portion 58 can be permitted.

Further, the reinforcing member 20 was formed in a triangular shape in plan view that is formed so as to be convex toward the vehicle rear side. However, the reinforcing member 20 may be another shape (e.g., a trapezoid shape or the like) provided that it is a taper shape whose width in the vehicle transverse direction becomes narrower while heading toward the vehicle rear side.

Further, due to the upper wall portion 26 of the front side member 12 extending in the vehicle transverse direction, the heights, in the vehicle vertical direction, of the upper-outer side ridgeline portion 36 and the upper-inner side ridgeline portion 38 that run along this upper wall portion 26 coincided with one another. However, for example, by making the upper wall portion 26 be inclined or have a step or the like with respect to the vehicle transverse direction, the heights, in the vehicle vertical direction, of the upper-outer side ridgeline portion 36 and the upper-inner side ridgeline portion 38 may be made to differ from one another. Further, in this case, the height, in the vehicle vertical direction, of the ceiling portion 62 of the reinforcing member 20 may be made to coincide with only that of the upper-outer side ridgeline portion 36.

Similarly, by making the lower wall portion 28 be inclined or have a step or the like with respect to the vehicle transverse direction, the heights, in the vehicle vertical direction, of the lower-outer side ridgeline portion 40 and the lower-inner side ridgeline portion 42 that run along the lower wall portion 28 also may be made to differ from one another. Further, in this case, the height, in the vehicle vertical direction, of the bottom wall portion 64 of the reinforcing member 20 may be made to coincide with only that of the lower-outer side ridgeline portion 40.

Further, for example, provided that the portion at the front end portion 12A side of the front side member 12 can be bent smoothly toward the vehicle transverse direction outer side, the height, in the vehicle vertical direction, of the ceiling portion 62 of the reinforcing member 20 may be made to coincide with only that of the upper-inner side ridgeline portion 38 among the upper-outer side ridgeline portion 36 and the upper-inner side ridgeline portion 38. Similarly, the height, in the vehicle vertical direction, of the bottom wall portion 64 of the reinforcing member 20 may be made to coincide with only that of the lower-inner side ridgeline portion 42 among the lower-outer side ridgeline portion 40 and the lower-inner side ridgeline portion 42.

Note that, in a case in which the heights, in the vehicle vertical direction, of the upper-outer side ridgeline portion 36 and the upper-inner side ridgeline portion 38 differ from one another in this way, either one of the upper-outer side ridgeline portion 36 and upper-inner side ridgeline portion 3, whose height in the vehicle vertical direction coincides with that of the ceiling portion 62, corresponds to an example of the upper side ridgeline portion. Similarly, in a case in which the heights, in the vehicle vertical direction, of the lower-outer side ridgeline portion 40 and the lower-inner side ridgeline portion 42 differ from one another, either one of the lower-outer side ridgeline portion 40 and lower-inner side ridgeline portion 42, whose height in the vehicle vertical direction coincides with that of the bottom wall portion 64, corresponds to an example of the lower side ridgeline portion.

Further, in the above-described embodiment, the side member outer 24 was formed in the shape of a flat plate, but may be formed so as to be symmetrical in the vehicle transverse direction with respect to the side member inner 22 (i.e., may be formed in a hat shape in cross-section that opens toward the vehicle transverse direction inner side). Further, the side member outer 24 may be formed in a hat shape in cross-section that opens toward the vehicle transverse direction inner side, and the side member inner 22 may be formed in the shape of a flat plate.

Note that, in a case in which the side member inner 22 and the side member outer 24 are formed in hat shapes in cross-section, the aforementioned upper wall portion 26 and lower wall portion 28 are formed at the side member inner 22 and the side member outer 24. Further, the upper-outer side ridgeline portion 36 and the lower-outer side ridgeline portion 40 are formed at the side member outer 24, and the upper-inner side ridgeline portion 38 and the lower-inner side ridgeline portion 42 are formed at the side member inner 22.

Further, in a case in which the side member outer 24 is formed in a hat shape in cross-section and the side member inner 22 is formed in the shape of a flat plate as described above, the aforementioned upper wall portion 26, lower wall portion 28, upper-outer side ridgeline portion 36, upper-inner side ridgeline portion 38, lower-outer side ridgeline portion 40 and lower-inner side ridgeline portion 42 are formed at the side member outer 24.

Note that, among the above-described plural modified examples, modified examples that can be combined may be combined appropriately.

An embodiment of the present invention has been described above, but the present invention is not limited to the above description and, other than the above, can of course be implemented by being modified in various ways within a scope that does not deviate from the gist thereof.

The invention claimed is:

1. A vehicle body front portion structure comprising:
   a front side member that is disposed, with a longitudinal direction thereof being in a vehicle longitudinal direction, at a vehicle transverse direction outer side portion of a vehicle body front portion;
   a bumper reinforcement that is disposed, with a longitudinal direction thereof being in a vehicle transverse direction, at a vehicle front side of the front side member, and that is supported via a supporting member at a front end portion of the front side member;
   a plate portion whose plate thickness direction is in the vehicle longitudinal direction, and that extends toward a vehicle transverse direction outer side from the front end portion of the front side member; and
   a reinforcing member that is disposed at a vehicle rear side of the plate portion, and that, together with the plate portion, forms a closed cross-section as seen in a plan cross-section, wherein:
the plate portion projects out further toward a vehicle transverse direction outer side than the bumper reinforcement,
the reinforcing member projects out toward a vehicle rear side from the plate portion, and
a rear end portion of the reinforcing member is made to be a free end.

2. The vehicle body front portion structure of claim 1, further comprising:
a plate-shaped member that is sandwiched between the supporting member and the front side member,
wherein the plate portion is formed at the plate-shaped member.

3. The vehicle body front portion structure of claim 1, wherein a position at which the plate portion is disposed is set such that a front wheel is positioned outside of a range of a rotational locus of the plate portion in a case in which the plate portion bendingly deforms toward a vehicle rear side with a proximal end portion thereof as a bending point.

4. The vehicle body front portion structure of claim 1, wherein the reinforcing member is formed in a taper shape whose width in the vehicle transverse direction becomes narrower toward a vehicle rear side.

5. The vehicle body front portion structure of claim 1, wherein the reinforcing member is formed in a triangular shape in plan view that is formed so as to be convex toward a vehicle rear side.

6. The vehicle body front portion structure of claim 1 wherein:
the reinforcing member has a ceiling wall portion and a bottom wall portion that are respectively formed in triangular shapes in plan view that are formed so as to be convex toward a vehicle rear side, and that oppose one another in a vehicle vertical direction,
a height, in the vehicle vertical direction, of the ceiling portion coincides with that of an upper side ridgeline portion that extends in the vehicle longitudinal direction along an upper wall portion of the front side member, and
a height, in the vehicle vertical direction, of the bottom wall portion coincides with that of a lower side ridgeline portion that extends in the vehicle longitudinal direction along a lower wall portion of the front side member.

7. The vehicle body front portion structure of claim 6, wherein
the upper wall portion of the front side member has an upper-outer side ridgeline portion that extends in the vehicle longitudinal direction along an end portion at a vehicle transverse direction outer side, and an upper-inner side ridgeline portion that extends in the vehicle longitudinal direction along an end portion at a vehicle transverse direction inner side, and the height, in the vehicle vertical direction, of the ceiling wall portion coincides with that of at least the upper-outer side ridgeline portion that serves as the upper side ridgeline portion, and
the lower wall portion of the front side member has a lower-outer side ridgeline portion that extends in the vehicle longitudinal direction along an end portion at a vehicle transverse direction outer side, and a lower-inner side ridgeline portion that extends in the vehicle longitudinal direction along an end portion at a vehicle transverse direction inner side, and the height, in the vehicle vertical direction, of the bottom wall portion coincides with that of at least the lower-outer side ridgeline portion that serves as the lower side ridgeline portion.

8. The vehicle body front portion structure of claim 6 wherein:
the reinforcing member has an outer side vertical wall portion that connects oblique side portions at a vehicle transverse direction outer side of the ceiling wall portion and the bottom wall portion, and an inner side vertical wall portion that connects oblique side portions at a vehicle transverse direction inner side of the ceiling wall portion and the bottom wall portion, and
a rear end portion of the reinforcing member is made to be a rear side ridgeline portion that extends in the vehicle vertical direction and is formed by a connected portion of the outer side vertical wall portion and the inner side vertical wall portion.

9. The vehicle body front portion structure of claim 1, wherein an end portion in the vehicle transverse direction of the plate portion projects out further toward the vehicle transverse direction outer side than an end portion in the vehicle transverse direction of the bumper reinforcement.

* * * * *